(12) United States Patent
Sun et al.

(10) Patent No.: US 11,760,687 B2
(45) Date of Patent: Sep. 19, 2023

(54) ALKALI-FREE ULTRAFINE GLASS FIBER FORMULA

(71) Applicant: TAISHAN FIBERGLASS ZOUCHENG CO., LTD., Jining (CN)

(72) Inventors: Yundong Sun, Jining (CN); Wei Li, Jining (CN); Degang Zhang, Jining (CN); Guo Zhang, Jining (CN); Qiang Fang, Jining (CN); Yongyan Li, Jining (CN); Cong Ding, Jining (CN); Guodong Liu, Jining (CN); Caihua Liu, Jining (CN)

(73) Assignee: TAISHAN FIBERGLASS ZOUCHENG CO., LTD., Jining (CN)

( * ) Notice: Subject to any disclaimer, the term of this patent is extended or adjusted under 35 U.S.C. 154(b) by 21 days.

(21) Appl. No.: 17/599,837

(22) PCT Filed: Dec. 29, 2020

(86) PCT No.: PCT/CN2020/000329
§ 371 (c)(1),
(2) Date: Sep. 29, 2021

(87) PCT Pub. No.: WO2021/134736
PCT Pub. Date: Jul. 8, 2021

(65) Prior Publication Data
US 2022/0169562 A1 Jun. 2, 2022

(30) Foreign Application Priority Data
Jan. 2, 2020 (CN) .......................... 202010002593.0

(51) Int. Cl.
C03C 13/00 (2006.01)
C03C 13/06 (2006.01)
C03C 3/087 (2006.01)
C03C 3/095 (2006.01)

(52) U.S. Cl.
CPC .............. *C03C 13/00* (2013.01); *C03C 3/087* (2013.01); *C03C 3/095* (2013.01); *C03C 2213/00* (2013.01)

(58) Field of Classification Search
CPC ................................ C03C 13/00; C03C 13/06
See application file for complete search history.

(56) References Cited

U.S. PATENT DOCUMENTS

2021/0130226 A1* 5/2021 Xing ........................ C03C 3/118

FOREIGN PATENT DOCUMENTS

| CN | 101423329 A | 5/2009 |
|----|-------------|--------|
| CN | 101503279 A | 8/2009 |
| CN | 102010134 A | 4/2011 |
| CN | 102786223 A | 11/2012 |
| CN | 102849956 A | 1/2013 |
| CN | 103145341 A | 6/2013 |
| CN | 105174732 A | 12/2015 |
| CN | 110606665 A | 12/2019 |
| CN | 111018358 A | 4/2020 |

* cited by examiner

*Primary Examiner* — Karl E Group
(74) *Attorney, Agent, or Firm* — Bayramoglu Law Offices LLC

(57) ABSTRACT

An alkali-free ultrafine glass fiber formula includes the following components, in mass percentage calculated based on 100 Kg: SiO2: 50% to 65%, $Al_2O_3$: 10% to 16.5%, CaO: 17% to 28%, MgO: 0.2% to 4.0%, $Na_2O$ and $K_2O$: 0.1% to 0.8% in total, $CeO_2$: 0.1% to 0.5%, $Li_2O$: 0.1% to 0.7%, $Fe_2O_3$: 0.05% to 0.6%, $TiO_2$: 0.1% to 1%, and impurities: the balance. In the preparation of alkali-free ultrafine glass fibers, no fluorine and boron-containing raw materials are used, and $CeO_2$ and $Li_2O$ are introduced, which avoids the use of $B_2O_3$ and F that have a large impact on the environment, and reduces environmental pollution. A single fiber strength of prepared glass fibers is about 9% higher than that of the traditional E glass fibers, and the comprehensive performance of a prepared glass fiber product is significantly superior than that of the existing E glass fiber product.

3 Claims, No Drawings

ALKALI-FREE ULTRAFINE GLASS FIBER FORMULA

CROSS REFERENCE TO THE RELAYED APPLICATIONS

This application is the national phase entry of International Application No. PCT/CN2020/000329, filed on Dec. 29, 2020, which is based upon and claims priority to Chinese Patent Application No. 202010002593.0, filed on Jan. 2, 2020, the entire contents of which are incorporated herein by reference.

TECHNICAL FIELD

The present disclosure belongs to the technical field of glass fibers, and specifically relates to an alkali-free ultrafine glass fiber formula.

BACKGROUND

In existing production of ultrafine glass fibers, $B_2O_3>5.0\%$ and $F>0.40\%$ are required. If contents of the glass components are lower than the above values, the glass forming performance will be compromised, such that it is difficult to make ultrafine glass fiber yarns. However, in the melting for alkali-free glass, $F_2$ easily reacts with $SiO_2$ to form volatile silicon fluoride, and about 50% of the silicon fluoride will be volatilized with a flue gas during the melting process. The treatment of fluorine-containing waste gas requires a lot of manpower and material resources, which causes a heavy economic burden to the glass fiber industry. Moreover, the fluorine-containing waste gas that is improperly treated and discharged into the atmosphere will lead to serious consequences and endanger the physical health of people. Boron compounds are also volatile and expensive ingredients, and if the boron compounds are improperly treated, volatiles thereof will be discharged into the atmosphere and also cause harm to plants and humans.

CN200810121473.1 discloses a low-boron and low-fluorine glass formula, including: $SiO_2$: 54% to 62%, CaO: 20% to 28%, $Al_2O_3$: 12% to 18%, $B_2O_3$: 0% to 5%, MgO: 2% to 6%, F: 0% to 0.4%, $K_2O$ and $Na_2O$: 0% to 0.8% in total, $TiO_2$: 0.1% to 1%, $Fe_2O_3$: 0.1% to 0.5%, $SO_3$: 0% to 0.6%, and impurities: lower than 1%. In the patent, the contents of $B_2O_3$, F, and $Al_2O_3$ are reduced, the contents of $SiO_2$, CaO, and MgO are increased, and the contents of alkali metals, $Fe_2O_3$, and $TiO_2$ are controlled, such as to obtain a glass composition that has the advantages of E glass, low boron and fluorine contents, and no inappropriate coloring and can be easily drawn and shaped. However, there are still trace amounts of fluorine and boron in the above composition, which have some impacts on the environment.

CN201310093103.2 discloses a fluorine-free, boron-free, and alkali-free glass fiber and a preparation method thereof. The glass fiber includes the following components: $SiO_2$: 58% to 60%, $CaO_2$: 2% to 25%, MgO: 2% to 3.5%, $Al_2O_3$: 13% to 15.0%, $Fe_2O_3$: 0.3% to 0.45%, $R_2O$: 0.2% to 0.8%, and $Li_2O$: 0.1% to 0.4%, where $R_2O$ is $Na_2O$ and $K_2O$. In the patent, volatile boron-containing raw materials are completely eliminated, and industrial lithium-containing tailings are used as one of the main raw materials, which lowers a melting temperature and greatly reduces exhaust emission. Glass fibers obtained in this patent have a single fiber strength significantly higher than that of traditional E glass fibers, with an increase of about 8%. Therefore, the performance of the glass fiber product produced in this patent is significantly better than the performance of the existing E glass fiber product. In this patent, although the addition of $Li_2O$ ensures fusibility of the glass, the high-temperature fining ability is insufficient, and a large number of small bubbles generated in glass cannot be effectively discharged, which affects the operational continuity of glass fibers. Thus, it is difficult to draw glass fibers of less than 10 μm, and the drawn glass fibers have hollow fibers due to high bubble content, which affects the product quality and reduces the operational efficiency.

SUMMARY

In view of the above technical problems, the present disclosure is intended to provide an alkali-free ultrafine glass fiber formula, which avoids the use of $B_2O_3$ and F that have a great impact on the environment, reduces environmental pollution, and improves the product quality.

The present disclosure provides an alkali-free ultrafine glass fiber formula, including the following components, in mass percentage calculated based on 100 Kg:

$SiO_2$: 50% to 65%, $Al_2O_3$: 10% to 16.5%, CaO: 17% to 28%, MgO: 0.2% to 4.0%, $Na_2O$ and $K_2O$: 0.1% to 0.8% in total, $CeO_2$: 0.1% to 0.5%, $Li_2O$: 0.1% to 0.7%, $Fe_2O_3$: 0.05% to 0.6%, $TiO_2$: 0.1% to 1%, and impurities: the balance.

Preferably, the alkali-free ultrafine glass fiber formula may include the following components, in mass percentage calculated based on 100 Kg:

$SiO_2$: 50% to 62%, $Al_2O_3$: 12% to 16.5%, CaO: 19% to 25%, MgO: 0.2% to 2.0%, $Na_2O$ and $K_2O$: 0.1% to 0.8% in total, $CeO_2$: 0.1% to 0.5%, $Li_2O$: 0.1% to 0.7%, $Fe_2O_3$: 0.05% to 0.45%, $TiO_2$: 0.1% to 1%, and impurities: the balance.

Preferably, the alkali-free ultrafine glass fiber formula may include the following components, in mass percentage calculated based on 100 Kg:

$SiO_2$: 50% to 55.5%, $Al_2O_3$: 14% to 16.5%, CaO: 19% to 25%, MgO: 0.2% to 0.5%, $Na_2O$ and $K_2O$: 0.1% to 0.8% in total, $CeO_2$: 0.1% to 0.4%, $Li_2O$: 0.1% to 0.5%, $Fe_2O_3$: 0.05% to 0.45%, $TiO_2$: 0.1% to 1%, and impurities: the balance.

The alkali-free ultrafine glass fiber formula of the present disclosure does not include $B_2O_3$ and F.

Among the components of the present disclosure, $SiO_2$ is an oxide to form the glass framework, which plays the role of improving strength and chemical stability. An excessively low $SiO_2$ content affects a glass fiber structure, deteriorates application performance, and is not conducive to subsequent processing. An excessively high $SiO_2$ content increases a viscosity of molten glass, affects the fining and homogenization of glass, and causes difficulty in drawing and shaping.

Among the components of the present disclosure, $Al_2O_3$ is an oxide to form the glass framework, which plays the roles of reducing phase separation in glass and improving chemical stability. An excessively low $Al_2O_3$ content causes phase separation in glass to form crystals, and makes it difficult to form continuous fibers. An excessively high $Al_2O_3$ content increases a viscosity of molten glass, affects the fining and homogenization of glass, and causes difficulty in drawing and shaping.

The glass fibers of the present disclosure can be prepared according to the following method: according to the selected components and mass percentages thereof selected in the present disclosure, corresponding raw materials (including powders of kaolin, pyrophyllite, quartz sand, quicklime, limestone, lithium-containing tailing, cerium oxide, etc.) are weighed and thoroughly mixed in a pneumatic homogenizer to obtain a mixed batch; the mixed batch is delivered to a silo at a furnace head and fed into a tank furnace to undergo high temperature melting to form molten glass; and the molten glass flows into an operational channel and is drawn into glass fibers by a drawing machine through a platinum-rhodium alloy bushing.

Among the components of the present disclosure, $TiO_2$ is added to form the network outer body of glass, which plays the roles of increasing the resistivity and acid resistance of glass and reducing the thermal expansion coefficient (CTE) of glass.

Among the components of the present disclosure, CaO is added to form the network outer body of glass, which plays the roles of reducing the viscosity of molten glass and accelerating the shaping. An excessively low CaO content increases the viscosity of molten glass and causes difficulty in drawing and shaping. An excessively high CaO content makes glass prone to crystallization. 0.2% to 2.0% of MgO can be added in combination with CaO to further adjust a shaping speed.

The formula of the present disclosure also includes $Li_2O$ and $CeO_2$ that play a synergistic role. $Li_2O$ is an oxide to provide non-bridging oxygen, which has the functions of high-temperature fluxing, accelerating glass melting, and reducing the viscosity of molten glass. Moreover, because small $Li^+$ ion radius and high electric field intensity will aggravate the crystallization tendency of glass to some extent, the high-temperature fining ability is insufficient and a large number of small bubbles generated in glass cannot be effectively discharged. However, $CeO_2$ is a variable-valence oxide that can be decomposed at a high temperature to produce oxygen, the solubility of oxygen decreases with the increase of temperature to form bubbles, and the bubbles continue to grow and float out of a glass surface. While going up, the bubbles continue to absorb tiny bubbles in glass to achieve a fining effect. Therefore, through the cooperative action of $CeO_2$ and $Li_2O$, the present disclosure solves the problem of glass melting and fining and improves the product quality.

Oxygen generated from the decomposition of $CeO_2$ in the formula of the present disclosure can also oxidize $Fe^{2+}$ in glass into $Fe^{3+}$, thereby playing the role of reducing coloring.

Compared with the prior art, the present disclosure has the following beneficial effects:

In the preparation of alkali-free ultrafine glass fibers according to the present disclosure, no fluorine and boron-containing raw materials are used, and $CeO_2$ and $Li_2O$ are introduced, which avoids the use of $B_2O_3$ and F that have a large impact on the environment, and reduces environmental pollution. A single fiber strength of prepared glass fibers is about 9% higher than that of the traditional E glass fibers, and the comprehensive performance of a prepared glass fiber product is significantly better than that of the existing E glass fiber product.

DETAILED DESCRIPTION OF THE EMBODIMENTS

The present disclosure will be further described below in conjunction with examples, and the content of the present disclosure is not restricted by the following examples. When a total content of all components is slightly less than or greater than 100%, it can be comprehended that the residual content refers to impurities or a small amount of unanalyzable components. According to the selected components and mass percentages thereof selected in each of Examples 1 to 5 of the present disclosure, corresponding raw materials (including powders of kaolin, pyrophyllite, quartz sand, quicklime, limestone, lithium-containing tailing, cerium oxide, etc.) were weighed and thoroughly mixed in a pneumatic homogenizer to obtain a mixed batch; the mixed batch was delivered to a silo at a furnace head and fed into a tank furnace to undergo high temperature melting to form molten glass; and the molten glass flowed into an operational channel and was drawn into glass fibers by a drawing machine through a platinum-rhodium alloy bushing. Specific mass percentages of raw materials calculated based on 100 Kg were shown in Table 1.

TABLE 1

Performance test data of Examples 1 to 5

| Component/% | Comparative Example Traditional E glass fiber | Example 1 | 2 | 3 | 4 | 5 |
|---|---|---|---|---|---|---|
| $SiO_2$ | 54.1 | 61 | 60 | 60 | 59.5 | 58 |
| $Al_2O_3$ | 14 | 13 | 13.2 | 13.5 | 13.1 | 14.4 |
| CaO | 22.2 | 22.5 | 23 | 22.7 | 23 | 24 |
| MgO | 1.1 | 1.5 | 1.5 | 1.5 | 1.8 | 1 |
| $Na_2O$ | 0.35 | 0.5 | 0.5 | 0.5 | 0.55 | 0.4 |
| $K_2O$ | 0.4 | 0.25 | 0.25 | 0.25 | 0.21 | 0.2 |
| $CeO_2$ | 0 | 0 | 0 | 0.15 | 0.4 | 0.4 |
| $Li_2O$ | 0 | 0.25 | 0.5 | 0.5 | 0.5 | 0.6 |
| $Fe_2O_3$ | 0.32 | 0.31 | 0.35 | 0.31 | 0.31 | 0.28 |
| $TiO_2$ | 0.45 | 0.42 | 0.4 | 0.38 | 0.42 | 0.4 |
| $B_2O_3$ | 6.35 | 0 | 0 | 0 | 0 | 0 |
| $F_2$ | 0.55 | 0 | 0 | 0 | 0 | 0 |
| Single fiber strength (MPa) | 2200 | 2408 | 2405 | 2403 | 2400 | 2398 |
| Shaping temperature (° C.) | 1175 | 1290 | 1287 | 1282 | 1282 | 1263 |
| Softening point (° C.) | 860 | 915 | 915 | 911 | 911 | 904 |
| Bubble content (/ounce) | 8 | 35 | 30 | 10 | 2 | 2 |

It can be seen from Table 1 that, after $CeO_2$ and $Li_2O$ are introduced in the production of ultrafine glass fibers, prepared glass fibers show a single fiber strength that is about 9% higher than that of the traditional E glass fibers; compared with ultrafine glass fibers prepared according to a formula including only $Li_2O$, ultrafine glass fibers prepared according to the formula including both $CeO_2$ and $Li_2O$ have a lower bubble content and a better fining effect; and due to a low bubble content, fiber breakage does not tend to occur during drawing, and it is more likely to draw ultrafine glass fibers.

What is claimed is:

1. An ultrafine glass fiber formula, comprising the following components, in mass percentage:
    $SiO_2$: 50% to 65%,
    $Al_2O_3$: 10% to 16.5%,
    CaO: 17% to 28%,
    MgO: 0.2% to 4.0%,
    $Na_2O$ and $K_2O$: 0.1% to 0.8% in total,
    $CeO_2$: 0.1% to 0.5%,
    $Li_2O$: 0.1% to 0.7%,
    $Fe_2O_3$: 0.05% to 0.6%,
    $TiO_2$: 0.1% to 1%, and
    impurities: the balance;
    wherein the components do not comprise $B_2O_3$ and F.

2. The ultrafine glass fiber formula according to claim 1, comprising the following components, in mass percentage:
    $SiO_2$: 50% to 62%,
    $Al_2O_3$: 12% to 16.5%,
    CaO: 19% to 25%,
    MgO: 0.2% to 2.0%,
    $Na_2O$ and $K_2O$: 0.1% to 0.8% in total,
    $CeO_2$: 0.1% to 0.5%,
    $Li_2O$: 0.1% to 0.7%,
    $Fe_2O_3$: 0.05% to 0.45%,
    $TiO_2$: 0.1% to 1%, and
    impurities: the balance.

3. The ultrafine glass fiber formula according to claim 1, comprising the following components, in mass percentage:
    $SiO_2$: 50% to 55.5%,
    $Al_2O_3$: 14% to 16.5%,
    CaO: 19% to 25%,
    MgO: 0.2% to 0.5%,
    $Na_2O$ and $K_2O$: 0.1% to 0.8% in total,
    $CeO_2$: 0.1% to 0.4%,
    $Li_2O$: 0.1% to 0.5%,
    $Fe_2O_3$: 0.05% to 0.45%,
    $TiO_2$: 0.1% to 1%, and
    impurities: the balance.

* * * * *